United States Patent [19]

Harris

[11] Patent Number: 4,498,493
[45] Date of Patent: Feb. 12, 1985

[54] PRESSURE VALVE ASSEMBLY FOR A FUEL TANK FILLER NECK CAP

[75] Inventor: Robert S. Harris, Connersville, Ind.

[73] Assignee: Stant Inc., Connersville, Ind.

[21] Appl. No.: 523,836

[22] Filed: Aug. 17, 1983

Related U.S. Application Data

[63] Continuation-in-part of Ser. No. 276,880, Jun. 24, 1981, abandoned.

[51] Int. Cl.$^3$ ............................................. F16K 17/196
[52] U.S. Cl. ................................ 137/469; 137/493.6; 220/203; 220/303
[58] Field of Search ............................. 137/469, 493.6; 220/203, 303

[56] References Cited

U.S. PATENT DOCUMENTS

| 177,564 | 5/1876 | Rudd | 137/469 |
| 2,295,931 | 9/1942 | Caminez | 137/469 X |
| 2,401,237 | 5/1946 | Gamble | 137/469 |
| 4,000,828 | 1/1977 | Crute et al. | 220/203 |
| 4,011,848 | 3/1977 | Coddington | 137/469 X |
| 4,046,163 | 9/1977 | Novak | 137/469 X |
| 4,091,955 | 5/1978 | Sloan, Sr. | 220/203 |
| 4,133,346 | 1/1979 | Smith et al. | 220/203 X |
| 4,142,549 | 3/1979 | Autry | 137/469 |

FOREIGN PATENT DOCUMENTS

| 1114684 | 10/1961 | Fed. Rep. of Germany | 137/469 |
| 706112 | 3/1954 | United Kingdom | 137/469 |

Primary Examiner—Robert G. Nilson
Attorney, Agent, or Firm—Barnes & Thornburg

[57] ABSTRACT

A pressure/vacuum valve assembly for a fuel tank filler neck comprises a pressure-release valve member, a vacuum-relief valve, and a pressure-release control member in a vent passageway. The vent passageway has an axially outwardly facing surface and a radially inwardly facing surface. A yieldable control spring urges the pressure-release valve member normally to close and seal the vent passageway. The pressure-release control member has an axially inwardly facing surface which forms a first restricted opening for the flow of fuel vapors. The control member has a radially outwardly facing surface which forms a second restricted opening with the radially inwardly facing surface of the vent passageway. The pressure-release valve member is urged in opposition to the control spring to open the vent passageway in response to a predetermined superatmospheric pressure and allow fuel vapor to flow in the first and second restricted openings. A relatively small increase in pressure in the restricted opening produces a large force against surfaces of both the pressure-release valve member and the pressure-release control member in opposition to the control spring to rapidly increase the flow of fuel vapor through the vent passageway. The combined surfaces of both the valve member and control member is about 350% greater than the surface of the valve member which is initially exposed to the vapor pressure.

2 Claims, 5 Drawing Figures

PRESSURE VALVE ASSEMBLY FOR A FUEL TANK FILLER NECK CAP

This is a continuation-in-part of Ser. No. 06/276,880, filed June 24, 1981, now abandoned.

The present invention relates to pressure/vacuum valve assemblies for a fuel tank filler neck cap. More particularly, the invention is concerned with an improvement for controlling the flow of fuel vapors when the pressure in the tank reaches a predetermined superatmospheric level.

Pressure/vacuum valve assemblies are well known. Such assemblies have previously been incorporated into caps for filler necks of fuel tanks to admit air into the tank through a vent passageway when pressure in the tank decreases to a predetermined subatmospheric level and to vent fuel vapors out of the tank through the vent passageway when pressure in the tank increases to a predetermined superatmospheric pressure. For example, a cap including a conventional pressure/vacuum valve assembly is disclosed in U.S. Pat. No. 4,091,955 assigned to the same assignee as the present application.

In general, these conventional pressure/vacuum valve assemblies have included a pressure-release valve positioned in a vent passageway having a surface exposed to the pressure in the tank, a first yieldable control spring urging the pressure-release valve normally to close the vent passageway, a vacuum-relief aperture provided in the pressure-release valve, a vacuum-relief valve member, and a second control spring urging the vacuum-relief valve normally to close the vacuum-relief aperture. In response to a predetermined superatmospheric pressure, the pressure-release valve is urged in opposition to the first control spring to open the vent passageway and, in response to a predetermined subatmospheric pressure, the vacuum-relief valve is urged in opposition to the second control spring to open the vacuum-relief aperture.

In a fuel tank filler neck cap, the pressure-release valve member must maintain a seal in its normally closed position until a predetermined superatmospheric pressure is produced in the fuel tank. Once such pressure has been achieved, it is then important that the vent passageway be rapidly opened, be maintained open, and provide a high flow of fuel vapor. Although the pressure/vacuum valve assemblies, such as the one disclosed in U.S. Pat. No. 4,091,955, provide a seal in the normally closed position of the pressure release valve, once the predetermined superatmospheric pressure is achieved in the tank, a relatively large pressure increase above the superatmospheric pressure is required in order to maintain the pressure-release valve in an open position and provide a high flow of fuel vapor.

One object of the present invention is to provide a pressure/vacuum valve assembly for a fuel tank filler neck cap which responds quickly to a predetermined superatmospheric pressure in the tank to open a vent passageway, and which thereafter provides a comparatively high flow of fuel vapor without a pressure increase above the initial opening superatmospheric pressure.

It is another object of the present invention to provide a pressure/vacuum valve assembly which provides a seal in the normally closed position of a pressure-release valve until a predetermined superatmospheric pressure is achieved in the tank and which in response to the predetermined superatmospheric pressure quickly opens the valve passageway and quickly provides high flow of fuel vapor.

Still another object of the present invention is to provide a pressure/vacuum valve assembly which employs a first surface area exposed to pressure in the tank to quickly open the valve passageway in response to superatmospheric pressure and a second surface area forming a restricted opening for the flow of fuel vapor, whereby a small increase in pressure in the restricted opening produces a large force against the first and second surface areas to rapidly increase the flow of fuel vapor.

Yet another object of the present invention is to provide a pressure/vacuum valve assembly where subsequent to the rapid release of fuel vapor a relative constant pressure is maintained to keep the vent passageway open until a safe level of pressure is reached in the tank. According to the present invention, the valve assembly responds to pressure in the fuel tank in a non-linear manner.

In accordance with the instant invention, a pressure-relief valve for a fuel tank filler neck cap comprises a housing which provides a vent passageway for venting fuel vapors out of the tank when pressure in the tank increases to a predetermined superatmospheric pressure. The housing includes an axially outwardly facing surface and a radially inwardly facing surface. A vent opening is provided in the axially outwardly facing surface. A pressure valve assembly is provided in the housing for controlling the venting of fuel vapor. The valve assembly includes a first valve member having a first axially inner surface area which is exposed to pressure in the tank. Yieldable means urge the first valve member against a valve seat which is provided by the housing axially outwardly facing surface Normally, the yieldable means maintains the first valve member against the valve seat. A second valve member is disposed between the first valve member and the yieldable means for controlling the flow of fuel vapors from the tank through the vent passageway. The second valve member includes a radially outer surface and a second axially inner surface encircling the first valve member. The first and second axially inner surface areas provide a combined axially inner surface area that is substantially greater than the first axially inner surface area. The second inner surface area forms a first annular restricted opening with the housing axially outwardly facing surface for the flow of fuel vapor in the vent passageway. The radially outer surface of the second valve member forms a second annular restricted opening with the housing radially inwardly facing surface for the flow of fuel vapor in the vent passageway.

The predetermined superatmospheric pressure applies a force to the first axially inner surface area to urge the first valve member in opposition to the yieldable means, which urges the first valve member away from the valve seat. The exposure of the combined axially inner surface area to a relatively small pressure increase in the first restricted opening produces a relatively larger force in opposition to the yieldable means to rapidly increase the flow of fuel vapor. The second restricted opening limits the flow of fuel vapor to maintain a generally constant pressure against the combined axially inner surface area to keep the first valve member apart from the valve seat until a safe pressure below the predetermined superatmospheric level is reached in the tank.

Illustratively, the first and second axially inner suface areas provide a combined axially inner surface area that is at least about 350% greater than the first axially inner surface area. The area of the second annular restricted opening, when the first valve member is initially urged away from the valve seat, is about 60% of the area of the vent opening.

Additionally, the radially inwardly facing surface of the housing is tapered outwardly so that the area of the second annular restricted opening increases as the first valve member is urged in opposition to the yieldable means. Preferably, the radially inward facing surface is tapered outwardly at an angle of about 1° to 5°.

One aspect of the instant invention is that the pressure-relief valve of the instant invention produces a non-linear response in relationship to the pressure in the fuel tank. This feature has the advantage of providing a pressure valve assembly which responds quickly to a predetermined superatmospheric pressure in the tank to open the vent passageway, which thereafter provides a high flow of fuel vapor through the passageway without the pressure in the tank increasing substantially above the initial opening superatmospheric pressure, and which remains open until a safe level of pressure is reached in the tank.

One feature of the instant invention is that there is a large area change from the area of the valve which is first exposed to pressure when the first valve member is in its sealed position, to the area of the valve exposed to pressure when the first valve member is moved away from the valve seat. The area exposed to pressure when the first valve member is unseated from its valve seat, is preferably at least about 350% greater than the area exposed to pressure when the first valve member is seated against the valve seat. Further, the second annular restrictive opening through which the vapor flows increases in size as the first valve member is urged away from its valve seat. These features have the advantage of providing the non-linear response and enabling the vent passageway to remain open until a safe level of pressure is reached in the tank. In operation, the constant pressure maintained by the second restricted opening may range between +20% and −40% of the initial opening superatmospheric pressure. Once the flow of fuel vapor begins through the vent passageway, the pressure against the combined surface areas will stay within this range until the pressure in the tank drops to a safe level.

Various other features and advantages of the present invention will become apparent in view of the following detailed description of one embodiment thereof, which description should be considered in conjunction with the accompanying drawings, in which.

Figure 1:
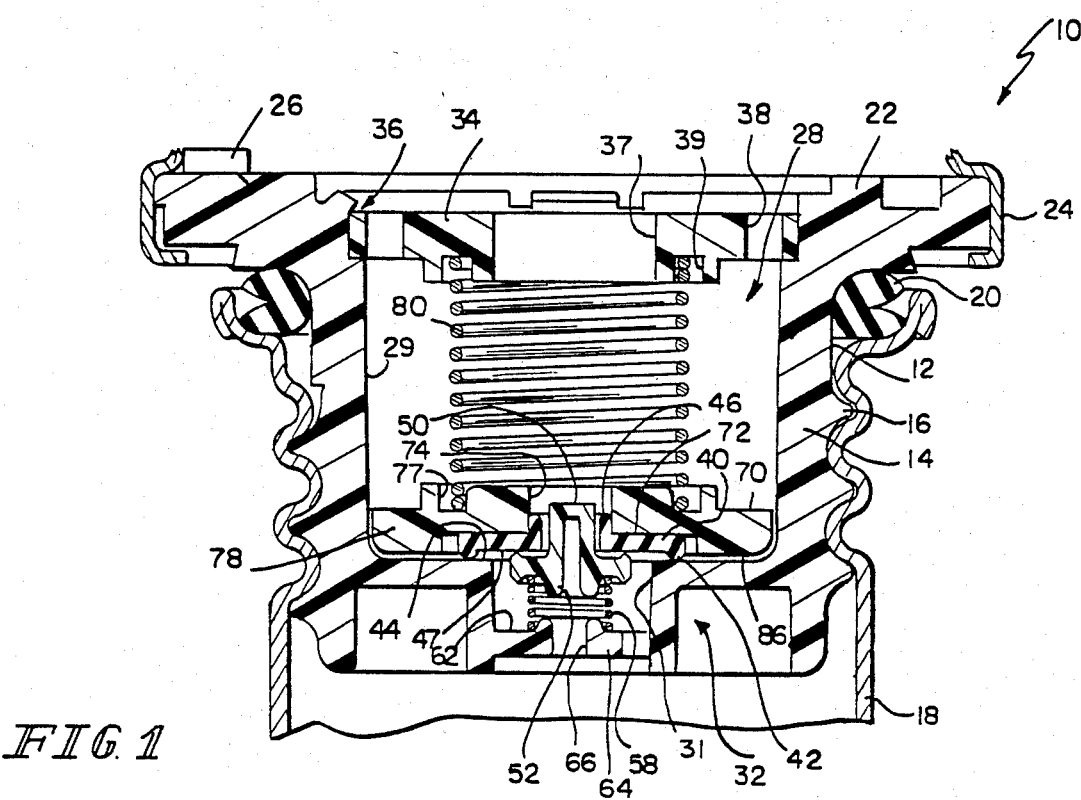
FIG. 1 is an axially sectional side elevational view of a portion of a cap including the pressure/vacuum valve assembly of the present invention.
Figure 2:
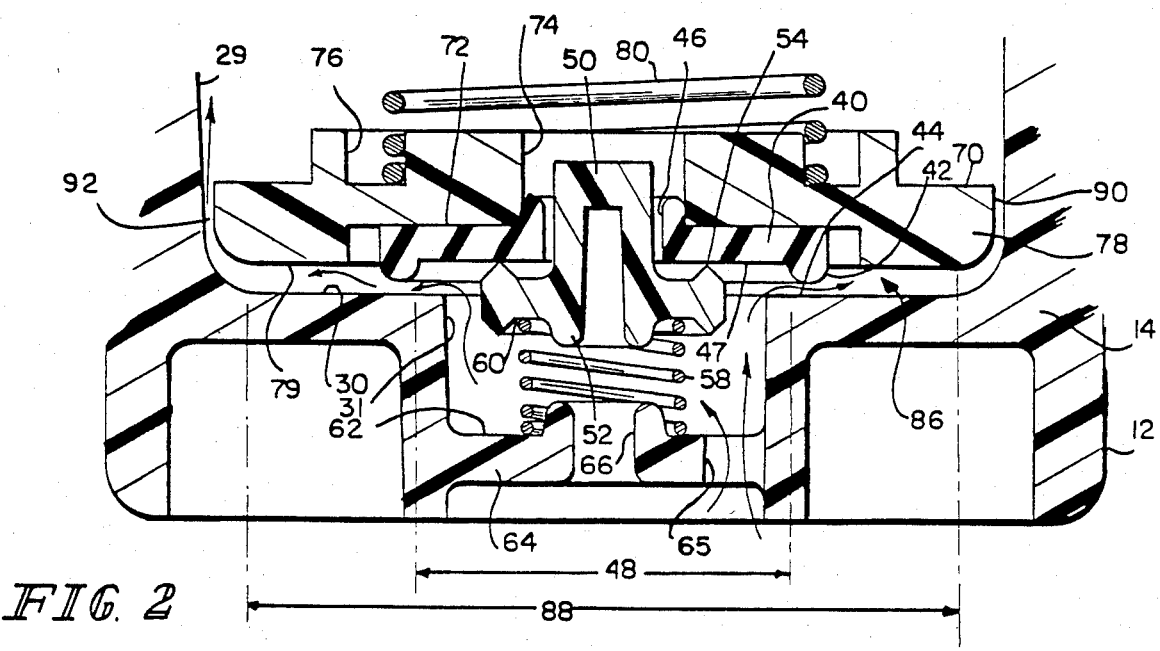
FIG. 2 is an enlarged fragmentary sectional view of the pressure/vacuum valve assembly of FIG. 1, showing the valve in a pressure-release position.

Referring now to FIGS. 1 and 2, a cap 10 for a filler neck of a fuel tank includes a molded plastic closure member 12 having an axially inwardly extending shank portion 14 which is threaded as indicated at 16 to engage a threaded filler neck 18 of a fuel tank (not shown). Closure 12 includes a gasket 20 which sealably engages the conventional peripherally and radially outwardly extending lip provided by the filler neck 18.

Cap 10 further includes a molded plastic shell member 24 secured to the closure member for rotation with respect to the closure member about the axis of the cap. Closure 12 also includes a flange 22 at its axially outer end. Flange 22 extends radially outwardly of the axis of closure 12.

Although the configuration of the cap 10 is not important to the present invention, one embodiment of the cap 10 may include an annular race 26 which is disposed for rotation within the shell 24 and which cooperates with camming surfaces to provide a torque-overriding connection between the shell 24 and closure 12 in the direction which advances the closure 12 into the fuel tank filler neck 18 and which cooperates to provide a direct connection between the shell 24 and closure 12 in the direction which removes the closure 12 from the filler neck 18.

Closure 12 further includes a pressure/vacuum valve housing 28 into which is assembled a pressure/vacuum valve assembly 32 constructed according to the present invention. Assembly 32 controls venting of pressure and relief of vacuum which develop within the fuel tank and controls the flow of fuel vapors through the housing to provide rapid venting of fuel vapors in response to a predetermined superatmospheric pressure in the tank.

Housing 28 is generally cylindrical and includes a radially inwardly facing surface 29 and an axially outwardly facing radially inwardly extending surface 30. A central circular vent opening 31 is provided in the axially outwardly facing surface 30 for admitting air and venting fuel vapor.

The valve assembly 32 is retained within the housing 28 by a circular retainer 34 which is press-fitted into the axially outer end 36 of housing 28. The retainer 34 of cap 10 of FIGS. 1 and 2 includes a central circular aperture 37 having a diameter of approximately 0.496 inch (1.26 cm). The retainer 34 further includes a series of radially spaced-apart circular apertures 38, each having a diameter of approximately 0.123 inch (0.312 cm). Pressure release and vacuum relief are accomplished through the vent passageway formed by housing 28 and through the apertures 37 and 38 provided in the circular retainer 34. The circular retainer 34 further includes an annular axially inwardly opening groove 39 which engages a control spring in a manner to be described later to retain the vent assembly 32 within the housing 28. Continuing to refer to FIGS. 1 and 2, the pressure/vacuum valve assembly 32 controls the venting of fuel vapors at a predetermined superatmospheric pressure out of the fuel tank (not shown) through the vent passageway formed by housing 28 and between the closure member 12 and the shell 24 of the cap 10 to the atmosphere. The assembly 32 also controls the entry of air through the vent passageway formed by the housing 30 into the fuel tank when the pressure in the fuel tank decreases to a predetermined subatmospheric level.

The pressure/vacuum valve assembly 32 includes a circular pressure-release valve member 40 including an annular, axially inwardly facing valve edge 42 which seats against a valve seat 44 provided by the axially outwardly facing surface 30 of the housing 28 to close the venting opening 31. The pressure-release valve member 40 includes a central circular aperture 46. In a preferred embodiment, the pressure-release valve member has a circular axially inner surface 47 exposed to the fuel vapor pressure within the fuel tank (not shown). In the embodiment illustrated in FIGS. 1 and 2, the axially inner surface 47 has a diameter of 0.65 inch (1.65 cm). The effective surface area 48 exposed to the pressure in the tank is therefore 0.332 sq. inch (2.14 sq. cm).

An axially outwardly extending guiding stem portion 50 of a vacuum-relief valve member 52 is received in the aperture 46, holding valve member 52 in alignment in the valve assembly 32. The valve member 52 includes an annular, axially outwardly facing valve edge 54 which cooperates with a seat region on the axially inner surface 47 of the pressure-release valve member 40. Valve edge 54 is held against the axially inner surface 47 by a vacuum-relief control spring 58 disposed between an axially inwardly facing surface 60 of the valve member 52 and the bottom 62 of a spring retainer cup 64 provided at the axially inner end of the housing 28. The vacuum-relief control spring 58 has a predetermined spring constant which allows the vacuum-relief valve member 52 to be urged in opposition to the spring 58 in response to a predetermined subatmospheric pressure within the fuel tank (not shown) to open the aperture 46 and allow air to pass through the housing 28 into the fuel tank. A venting aperture 66 is provided at the bottom 62 of the spring retainer cup 64 for venting air and pressure into and out of the fuel tank. In the embodiment illustrated in FIGS. 1 and 2, the venting aperture 66 has a diameter of approximately 0.100 inch (0.254 cm). In addition, retainer cup 64 contains four radially disposed slots 65 to provide additional area for flow of vapor and/or air.

The pressure/vacuum valve assembly 32 further includes a circular pressure-release control plate 70 for controlling the flow of fuel vapor through the housing when the pressure-release valve member 40 is unseated to its open position, shown in FIG. 2, in response to a predetermined superatmospheric pressure in the tank. The circular pressure-release control plate 70 is seated on the axially outer surface 72 of the pressure-release valve member 40. The control plate 70 includes a central circular aperture 74 and an annular axially outwardly opening groove 76. An annular radially outwardly extending flange 78 has an axially inner surface 79 which is exposed to the pressure of the fuel vapor when the pressure-release valve member 40 is in its open position. In the embodiment illustrated in FIGS. 1 and 2, control plate 70 has a diameter of approximately 1.22 inches (3.10 cm) and the aperture 74 has a diameter of 0.250 inch (0.635 cm). The valve edge 42 of the pressure-release valve member 40 is yieldably urged against the seat 44 provided on the axially outwardly facing surface 30 of the housing 28, and the pressure-release control member 70 is urged against the axially outer surface 72 of the pressure-release valve member 40 by a pressure-release control spring 80. Spring 80 is held in place between the pressure-release control plate 70 and the retainer 34 which is press-fitted into the axially outer end 36 of housing 30. Control spring 80 is positioned in the grooves 39, 77 of the retainer 34 and the pressure-release control member 70, respectively, and has a spring constant for yieldably urging the pressure-release valve member 40 against the seat 44 normally to close the vent opening 31 in the housing 30.

In its closed position, the pressure-release valve member 40 provides a seal between the valve edge 42 and the valve seat 44 until the pressure in the fuel tank reaches a predetermined superatmospheric pressure. In response to the predetermined superatmospheric pressure against the axially inner surface 44 of the pressure-release valve member 40, the valve 40 is urged axially outwardly to open the vent passageway. Axially outward movement of the venting valve 40 occurs relatively quickly in order to rapidly open the vent passageway.

Figure 5:
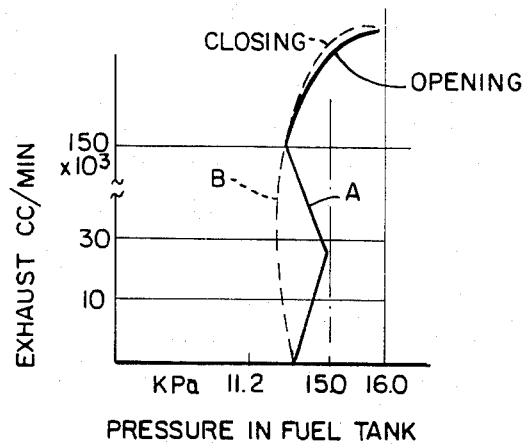
FIG. 5 is a graphical representation of the flow versus tank pressure characteristics of the instant invention.

The axially outward movement of the pressure-release valve member 40 results in corresponding movement of the pressure-release control member 70. The axially inner surface 79 of the control member 70 cooperates with the axially outwardly facing surface 30 of housing 28 to provide an annular restricted opening 86 for the flow of fuel vapors from the tank. The clearance between the axially inner surface 79 of the control plate 70 and the surface 30 of the housing 28 is very small. It should be noted that before the pressure-release valve member 40 is moved axially outward in response to the predetermined superatmospheric pressure, the pressure level in the restricted opening 86 will be less than the superatmospheric pressure. Therefore, once the fuel vapors begin to flow through the restricted opening, the pressure level in the opening will increase until it reaches the predetermined superatmospheric level. As shown in FIG. 2, the combined surface area 88 (0.950 sq. in.; 6.13 sq. cm) of the inner surfaces 47, 79 is substantially larger than the surface area 48 of the pressure-release valve member 40. When the fuel vapor flows through the opening 86, the combined surface area 88 of the surfaces 47, 79 is exposed to the predetermined superatmospheric pressure. Due to the restriction of opening 86, a relatively small increase in pressure level in the annular opening 86 produces a greater force against the spring 80 to increase the size of opening 86 and the flow rate of the fuel vapors through the opening 86. This relationship is shown in FIG. 5. The combination of the relatively small increase in pressure level in the opening 86 on inner surface 79 and the predetermined superatmospheric pressure on inner surface 47 creates a force on the combined surfaces 79 and 47 which is substantially greater than the initial force produced by the predetermined superatmospheric pressure on surface 47 to rapidly increase the size of opening 86.

The radially outwardly extending flange 78 of the pressure-release control member 70 also includes a radially outer surface 90 which, in cooperation with the radially inwardly facing surface 29 of the housing 28, forms a radially outer restricted opening 92. From the opening 86, fuel vapor flows through opening 92 and into the housing 28 to be released into the atmosphere. Subsequent to the initial rapid release of fuel vapor, the pressure level in opening 86 stabilizes. The radially outer opening 92 serves to restrict the flow of fuel vapor, after the initial rapid release, to maintain a constant pressure against the surfaces 47, 79. This constant pressure is generally at or slightly below the predetermined superatmospheric pressure to keep the pressure-release valve 40 from being urged back against the seat 44 immediately after the rapid release and also to maintain the valve 40 in an open position until the pressure in the tank drops to a safe level. This relationship is also shown in FIG. 5. It will be understood that the constant pressure level must exert a force against the surfaces 47 and 79 which generally equals the force being exerted by the compressed control spring 80 in order to keep the vent passageway open after the initial rapid release of the fuel vapor.

As can best be seen by the graph in FIG. 5, the pressure/vacuum valve assembly 32 of the present invention seals the vent passageway formed by the housing 28 until the pressure within the fuel tank reaches a predetermined superatmospheric pressure When the predetermined superatmospheric pressure is applied to the effective surface area 48 of the axially inner surface 47 of the release valve member 40, the valve member 40 is quickly moved axially outward from its seat 44 to allow immediate release of the pressure. In response to axially outward movement of the release valve member 40, fuel vapor flows into the annular restricted opening 86. The axially inner surface 79 of the control member 70 is therefore also exposed to the superatmospheric pressure in the fuel tank and the pressure level in the opening 86 begins to increase In response to a relatively small increase in pressure in the opening 86, the combined pressures against surfaces 79 and 47 produces a greater force against the control spring 80 to further move the pressure-release valve 40 and pressure-release control member 70 axially outward, thereby to rapidly increase the flow rate of the fuel vapor through the vent passageway in the housing 28. Subsequent to the initial rapid release of fuel vapor, the radially outer opening 92 restricts the fuel flow to maintain a constant pressure against surfaces 47, 79 at or slightly below the superatmospheric pressure to keep the vent passageway open until the pressure in the tank drops to a safe level.

Figure 3:
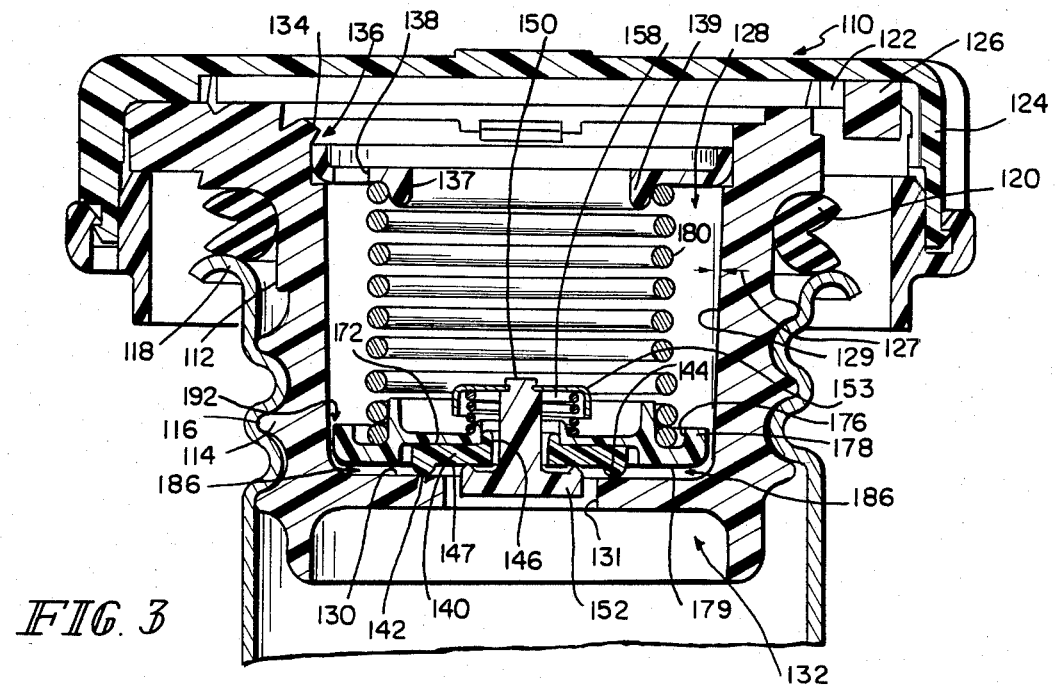
FIG. 3 is an axially sectional side elevational view of another embodiment of a cap including the pressure/vacuum valve assembly of the present invention.
Figure 4:
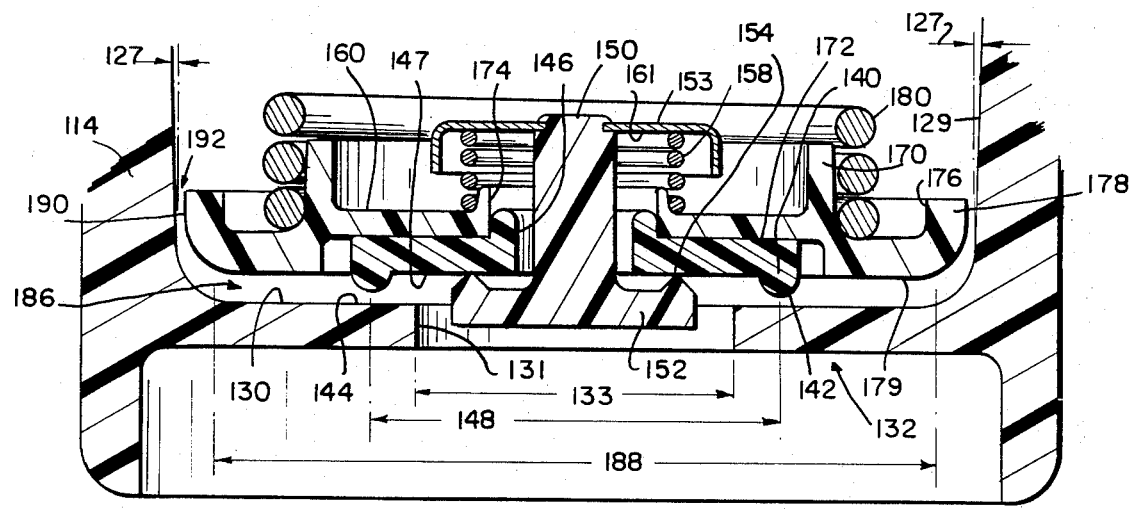
FIG. 4 is an enlarged fragmentary sectional view of the pressure/vacuum valve assembly of FIG. 3, showing the valve in a pressure-release position.

Another embodiment of a pressure vaccum valve assembly for a fuel tank is shown in FIGS. 3 and 4. In the illustrative embodiment the valve assembly is in a cap 110 for a filler neck of a fuel tank. Cap 110 may include a molded plastic closure member 112 having an axially inwardly extending shank portion 114 which is threaded as indicated at 116 to engage a threaded filler neck 118 of a fuel tank (not shown). Closure 112 includes a gasket 120 which sealably engages the conventional peripherally and radially outwardly extending lip provided by the filler neck 118.

Cap 110 further includes a molded plastic shell member 124 secured to the closure member for rotation with respect to the closure member about the axis of the cap. Closure 112 also includes a flange 122 at its axially outer end. Flange 122 extends radially outwardly of the axis of closure 112.

Similar to cap 10 (shown in FIGS. 1 and 2), cap 110 may include an annular race 126 which is disposed for rotation within the shell 124 and which cooperates with camming surfaces to provide a torque-overriding connection between the shell 124 and closure 112 in the direction which advances the closure 112 into the fuel tank filler neck 118 and which cooperates to provide a direct connection between the shell 124 and closure 112 in the direction which removes the closure 112 from the filler neck 118.

Closure 112 further includes a pressure/vacuum valve housing 128 into which is assembled a pressure/vacuum valve assembly 132 constructed according to the present invention. Assembly 132 controls venting of pressure and relief of vacuum which develop within the fuel tank and controls the flow of fuel vapors through the housing to provide rapid venting of fuel vapors in response to a predetermined superatmospheric pressure in the tank.

Housing 128 is generally cylindrical and includes a radially inwardly facing surface 129 and an axially outwardly facing radially inwardly extending surface 130. Radially inwardly facing surface 129 is tapered (angled outwardly) with respect to axially outwardly facing, radially inwardly extending surface 130. Radially inwardly facing surface 129 is tapered at an angle 127 which is in the general range of 1°–5° from the axis of the cap 110.

In the embodiment illustrated in FIGS. 3 and 4, the radially inwardly facing surface 129 has a diameter of 1.271 inch (3.228 cm) and a cross-sectional area of 1.269 sq. inches (8.186 sq. cm) near the axially outwardly facing surface 130, and a diameter of 1.391 inch (3.533 cm), and a cross-sectional area of 1.520 sq. inches (9.804 sq. cm) near the axially outer portion of housing 128.

A central circular vent opening 131 is provided in the axially outwardly facing surface 130 for admitting air and venting fuel vapor. In the embodiment illustrated in FIGS. 3 and 4, vent opening 131 has a diameter of 0.50 inches (1.270 cm). The effective available flow area 133 into and out of the cap (when engaging the filler neck 118) is therefore 0.196 sq. inch (1.267 sq. cm). An elongated vent opening inlet tube (not shown) can extend inwardly into the tank from vent opening 131 to provide a flow input area to vent opening 131 of a predetermined size as large as or smaller than vent opening 131.

The valve assembly 132 is retained within the housing 128 by a retainer 134 which is press-fitted into the axially outer end 136 of housing 128. The retainer 134 of the embodiment shown in FIGS. 3 and 4 includes a central circular aperture 137 having a diameter of approximately 0.496 inch (1.26 cm). The retainer 134 further includes a series of radially spaced-apart circular apertures 138, each having a preferred diameter of approximately 0.123 inch (0.312 cm) Pressure release and vacuum relief are accomplished through the vent passageway formed by housing 128 and through the apertures 137 and 138 provided in the circular retainer 134. The retainer 134 further includes an annular axially inwardly extending lip 139 which engages a control spring in a manner to be described later to retain the vent assembly 132 within the housing 128. Continuing to refer to FIGS. 3 and 4, the pressure/vacuum valve assembly 132 controls the venting of fuel vapors at a predetermined superatmospheric pressure out of the fuel tank (not shown) through the vent passageway formed by housing 128 and between the closure member 112 and the shell 124 of the cap 110 to the atmosphere. The assembly 132 also controls the entry of air through the vent passageway formed by the housing 130 into the fuel tank when the pressure in the fuel tank decreases to a predetermined subatmospheric level.

The pressure/vacuum valve assembly 132 includes a circular pressure-release valve member 140 including an annular, axially inwardly facing valve edge 142 which seats against a valve seat 144 provided by the axially outwardly facing surface 130 of the housing 128 to close the venting opening 131. The pressure-release valve member 140 includes a central circular aperture 146. In the embodiment illustrated in FIGS. 3 and 4, the pressure-release valve member 140 has a circular axially inner surface 147 exposed to the fuel vapor pressure within the fuel tank (not shown). In the embodiment illustrated in FIGS. 3 and 4, the axially inner surface 147 has a diameter of 0.650 inch (1.651 cm). The effective surface area 148 exposed to the pressure in the tank is therefore 0.331 sq. inch (2.141 sq. cm).

An axially outwardly extending guiding stem portion 150 of a vacuum-relief valve member 152 is received in the aperture 146, holding valve member 152 in alignment in the valve assembly 132. The valve member 152 includes a top cap member 153 disposed above aperture 146 and an annular, axially outwardly facing valve edge 154 which cooperates with a seat region on the axially inner surface 147 of the pressure-release valve member 140. Valve edge 154 is held against the axially inner surface 147 by a vacuum-relief control spring 158 disposed between an axially outwardly facing surface 160 of circular pressure release control plate 170 and the axially inwardly facing surface 161 of top cap member 153. The vacuum-relief control spring 158 has a predetermined spring constant which allows the vacuum-relief valve member 152 to be urged in opposition to the spring 158 in response to a predetermined subatmospheric pressure within the fuel tank (not shown) to open the aperture 146 and allow air to pass through the housing 128 into the fuel tank.

The circular pressure-release control plate 170 of pressure/vacuum valve assembly 132 controls the flow of fuel vapor through the housing when the pressure-release valve member 140 is unseated from its valve seat (in its open position), shown in FIG. 4, in response to a predetermined superatmospheric pressure in the tank. The circular pressure-release control plate 170 is seated on the axially outer surface 172 of the pressure-release valve member 140. The control plate 170 includes a central circular aperture 174 and an annular axially outwardly opening groove 176. An annular radially outwardly extending flange 178 has an axially inner surface 179 which is exposed to the pressure of the fuel vapor when the pressure-release valve member 140 is in its open position, unseated from valve seat 144. In the embodiment shown in FIGS. 3 and 4, control plate 170 has a diameter of approximately 1.215 inches (3.086 cm) and the aperture 174 has a diameter of 0.250 inch (0.635 cm). The control plate 170 thus has an inner surface 179 having an area of 1.160 sq. inches (7.480 sq. cm) which is exposed to the flow of vapor when valve 140 is unseated from its valve seat 144. The axially inner surface of area 148 of the valve member 140, when combined with the additional axially inner area of surface 179 of the control plate 170, provides a combined surface area 188 which is at least about 350% greater than the axially inner surface area 148 of the valve member 140 alone.

The valve edge 142 of the pressure-release valve member 140 is yieldably urged against the seat 144 provided on the axially outwardly facing surface 130 of the housing 128, and the pressure-release control member 170 is urged against the axially outer surface 172 of the pressure-release valve member 140 by a pressure-release control spring 180. Spring 180 is held in place between the pressure-release control plate 170 and the retainer 134 which is press-fitted into the axially outer end 136 of housing 130. Control spring 180 is positioned around the outer periphery of lip 139 and inserted in groove 176 of the retainer 134 and the pressure-release control member 170, respectively, and has a spring constant for yieldably urging the pressure-release valve member 140 against the seat 144 normally to close the vent opening 131 in the housing 130.

The performance characteristics of a pressure-relief valve assembly constructed according to the present invention are graphically represented in FIG. 5. The graph in FIG. 5 plots the exhaust flow of vapor through the cap 10 or 110 as a function of fuel tank pressure. Line A depicts the performance of the valve assembly upon opening and line B depicts the performance of the valve assembly as it closes. In its closed (or seated) position, the pressure-release valve member 140 provides a seal between the valve edge 142 and the valve seat 144 until the pressure in the fuel tank reaches a predetermined superatmospheric pressure, illustratively, 11.2 KPa. In response to the predetermined superatmospheric pressure against the axially inner surface 144 of the pressure-release valve member 140, the valve 140 is urged axially outwardly to open the vent passageway. Axially outward movement of the venting valve 140 occurs relatively quickly in order to rapidly open the vent passageway.

The axially outward movement of the pressure-release valve member 140 results in corresponding movement of the pressure-release control member 170. The axially inner surface 179 of the control member 170 cooperates with the axially outwardly facing surface 130 of housing 128 to provide an annular restricted opening 186 for the flow of fuel vapors from the tank. The clearance between the axially inner surface 179 of the control plate 170 and the surface 130 of the housing 128 is very small.

It should be noted that before the pressure-release valve member 140 is moved axially outward in response to the predetermined superatmospheric pressure, the pressure level in the restricted opening 186 will be less than the superatmospheric pressure. Therefore, once the fuel vapors begin to flow through the restricted opening, the pressure level in the opening will increase until it reaches the predetermined superatmospheric level. As shown in FIG. 4 and discussed above, the combined surface area 188 (1.16 sq. inch; 0.7480 sq. cm) of the inner surfaces 147, 179 is at least 350% greater than the surface area 148 of the pressure-release valve member 140. When the fuel vapor flows through the opening 186, the combined surface area 188 of the surfaces 147, 179 is exposed to the predetermined superatmospheric pressure. Due to the restriction of opening 186, a relatively small increase in pressure level in the annular opening 186 produces a greater force against the spring 180 to increase the size of opening 186 and the flow rate of the fuel vapors through the opening 186. This relationship is shown in FIG. 5. The combination of the relatively small increase in pressure level in the opening 186 on inner surface 179 and the predetermined superatmospheric pressure on inner surface 147 creates a force on the combined surfaces 179 and 147 which is substantially greater than the initial force produced by the predetermined superatmospheric pressure on surface 147 to rapidly increase the size of opening 186.

The radially outwardly extending flange 178 of the pressure-release control member 170 also includes a radially outer surface 190 which, in cooperation with the radially inwardly facing and outwardly tapering surface 129 of the housing 128, forms a radially outer restricted opening 192. From the opening 186, fuel vapor flows through opening 192 and into the housing 128 to be released into the atmosphere. As shown in line A of FIG. 5, the flow rate of vapor through the cap 110 increases rapidly in response to a slight increase in pressure in the tank, once the predetermined pressure level has been reached. Subsequent to the initial rapid release of fuel vapor, the pressure level in opening 186 stabilizes. The radially outer opening 192 serves to restrict the flow of fuel vapor, after the initial rapid release, to maintain a constant pressure against the surfaces 147, 179. This constant pressure is generally at or slightly below the predetermined superatmospheric pressure to keep the pressure-release valve 140 from being urged back against the seat 144 immediately after the rapid release and also to maintain the valve 140 in an open position until the pressure in the tank drops to a safe level. It will be understood that the constant pressure level must exert a force against the surfaces 147 and 179 which generally equals the force being exerted by the compressed control spring 180 in order to keep the vent passageway open after the initial rapid release of the fuel vapor. As is represented in line B, the valve 140 remains open until the pressure in the fuel tank is at or below the predetermined level to ensure that the pressure in the tank is at a safe level before the valve 140 closes to restrict flow through the caps 110.

In the embodiment illustrated in FIGS. 3 and 4, effective flow area of annular restricted opening 192 (when valve 140 is initially moved axially outwardly) is about 60% of the effective flow area 133 of vent opening 131 or inlet tube (not shown). Because the radially inwardly facing wall 129 is tapered outwardly, the effective flow area of annular restricted opening 186 increases as the valve member 140 and pressure relief control plate 170 are urged axially outwardly away from valve seat 144. Illustratively, the effective flow area of the annular restricted opening 192 may increase from about 60% of the effective flow area 133 of vent opening 131 to approximately 100% of the effective flow area 133 of vent opening 131 as the valve member 140 and control plate 170 are urged axially outwardly in response to a superatmospheric condition in the tank.

The outward tapering of radially inwardly facing walls 129 helps maintain a relatively constant pressure in the vent passageway to keep the vent passageway open until a safe level of pressure is reached in the tank.

It can be appreciated from the above description and the graph in FIG. 5 that the pressure/vacuum valve assembly 132 of the present invention seals the vent passageway formed by the housing 128 until the pressure within the fuel tank reaches a predetermined superatmospheric pressure. When the predetermined superatmospheric pressure is applied to the effective surface area 148 of the axially inner surface 147 of the release valve member 140, the valve member 140 is quickly moved axially outward from its seat 144 to allow immediate release of the pressure. In response to axially outward movement of the release valve member 140, fuel vapor flows into the annular restricted opening 186. The axially inner surface 179 of the control member 170 is therefore also exposed to the superatmospheric pressure in the fuel tank and the pressure level in the opening 186 begins to increase. In response to a relatively small increase in pressure in the opening 186, the combined pressures against surfaces 179 and 147 produces a greater force against the control spring 180 to further move the pressure-release valve 140 and pressure-release control member 170 axially outward, thereby to rapidly increase the flow rate of the fuel vapor through the vent passageway in the housing 128. Subsequent to the initial rapid release of fuel vapor, the radially outer opening 192 restricts the fuel flow to maintain a constant pressure against surfaces 147, 179 at or slightly below the superatmospheric pressure to keep the vent passageway open until the pressure in the tank drops to a safe level. As shown in FIG. 5, the relationship of flow of vapor through the caps 10, 110 to pressure in the fuel tank is non-linear, differing from conventional poppet valves.

What is claimed is:

1. A cap for a filler neck of a fuel tank comprising a housing providing a vent passageway for venting fuel vapors out of the tank when pressure in the tank increases to a predetermined superatmospheric pressure, the housing including an axially outwardly facing surface and a radially inwardly facing surface, a vent opening provided in the axially outwardly facing surface, a pressure valve assembly in the housing for controlling the venting of fuel vapor, the valve assembly including a first valve member having a first axially inner surface area exposed to the pressure in the tank, yieldable means urging the first valve member against a valve seat provided by the housing axially outwardly facing surface normally to close the vent opening, a second valve member disposed between the first valve member and the yieldable means for controlling flow of fuel vapors from the tank through the vent passageway, the second valve member including a radially outer surface and a second axially inner surface area encircling the first valve member, the first and second axially inner surface areas providing a combined axially inner surface area that is at least about 350% greater than the first axially inner surface area, the second inner surface area forming a first annular restricted opening with the housing axially outwardly facing surface for the flow of fuel vapor in the vent passageway, the radially outer surface of the second valve member forming a second annular restricted opening with the housing radially inwardly facing surface for the flow of fuel vapor in the vent passageway, the predetermined superatmospheric pressure applying a force to the first axially inner surface area to urge the first valve member in opposition to the yieldable means and open the vent opening to urge the first valve member away from the valve seat, exposure of the combined axially inner surface area to a relatively small pressure increase in the first restricted opening producing a relatively larger force in opposition to the yieldable means to rapidly increase the flow of fuel vapor, the second restricted opening limiting the flow of fuel vapor to maintain a generally constant pressure against the combined axially inner surface area to keep the vent opening open until a safe pressure level below the predetermined superatmospheric level is reached in the tank.

2. The invention of claim 1 wherein the second annular restricted opening has an effective flow area of about 60% of the flow area of the vent opening in the axially outwardly facing surface of the vent passageway when the first valve member is initially urged away from the valve seat.

* * * * *